United States Patent

[11] 3,602,737

[72] Inventor Helmut Radecke
Darmstadt, Germany

[21] Appl. No. 12,281
[22] Filed Feb. 18, 1970
[45] Patented Aug. 31, 1971
[73] Assignee Fernseh GmbH
Darmstadt, Germany
[32] Priority Feb. 19, 1969
[33] Germany
[31] P 19 08 247.4

[54] CIRCUIT ARRANGEMENT FOR REDUCTION OF HIGH FREQUENCY NOISE DISTURBANCES IN WIDE BANDSIGNALS SUCH AS VIDEO SIGNALS
4 Claims, 9 Drawing Figs.

[52] U.S. Cl. .......... 307/231, 307/255, 328/161, 328/165, 328/167
[51] Int. Cl. .......... H03k 5/20
[50] Field of Search .......... 178/6; 307/231, 255; 328/158, 161, 165, 167

[56] References Cited
UNITED STATES PATENTS

| | | | |
|---|---|---|---|
| 3,181,075 | 4/1965 | Klass .......... | 328/167 |
| 3,327,227 | 6/1967 | Sykes et al. .......... | 328/167 |
| 3,431,501 | 3/1969 | David et al. .......... | 328/161 |

OTHER REFERENCES
Moulds, " Variable Cutoff Fitters," Vol. 7, No. 12, May 1965, IBM Technical Disclosure Bulletin, p. 1140– 1141

*Primary Examiner*—Donald D. Forrer
*Assistant Examiner*—R. E. Hart
*Attorney*—Littlepage, Quaintance, Wray & Aisenberg

ABSTRACT: System for reducing noise in video signals by subtracting coherent noise modulation from useful signal. The high frequency component of the video signal is separated into parts above and below a given amplitude. The low-amplitude part corresponds to the noise level and is subtracted from the wide-band signal. The high-amplitude part is restored for compensation.

Inventor:
Helmut Rädecke

Littlepage, Quaintance, Wray & Aisenberg
by Attorneys

Fig. 2e
Fig. 2f
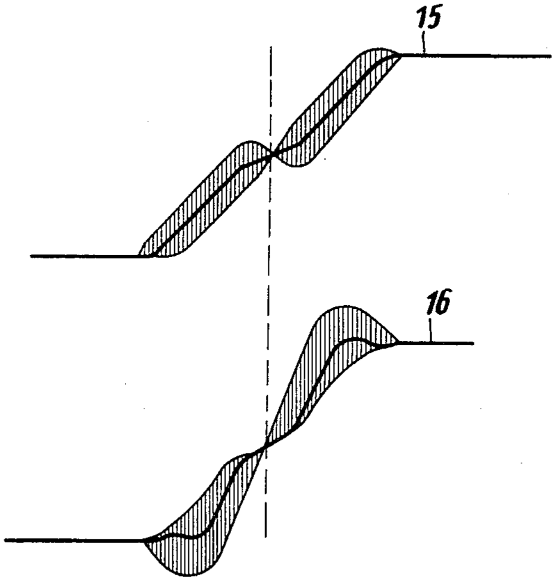
Fig. 2
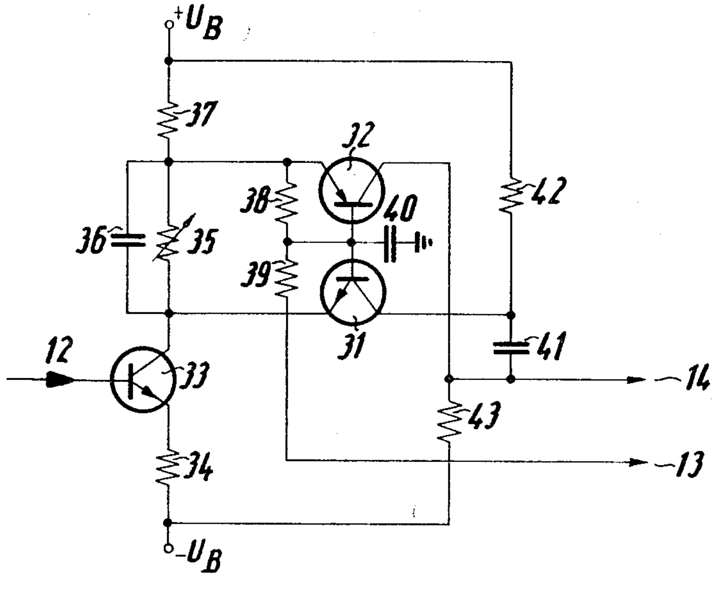
Fig. 3
Inventor:
Helmut Rädecke
by Littlepage, Quaintance, Wray & Aisenberg
Attorneys

CIRCUIT ARRANGEMENT FOR REDUCTION OF HIGH FREQUENCY NOISE DISTURBANCES IN WIDE BANDSIGNALS SUCH AS VIDEO SIGNALS

BACKGROUND OF THE INVENTION

1. Field of the Invention

The invention relates to a circuit arrangement for reducing high frequency noise disturbance in wide-band electrical signals, particularly television signals.

2. Description of the Prior Art

Electrical signals are frequently subject to disturbances superimposed thereon which are caused, in the case of very small signals, by statistical distribution of the elementary quanta of the signal current. The energy of these disturbances varies directly with the ban width; i.e. becomes greater corresponding to greater band widths of the electrical signal. In television signals, which have a band width of several megacycles, these noise disturbances are exhibited during reproduction as an uneven background of the television picture. The disturbance amplitude can in this case exhibit the same amplitude throughout the frequency range of the signal. In many cases the disturbance amplitude increases with the frequency (the so-called triangular shaped noise) and accordingly exhibits itself as a particularly intense phenomenon in the high-frequency ranges.

A prior art system for reducing the influence of these disturbances in television apparatus has the high-frequency transmission characteristic of the apparatus dependent upon the signal amplitude, whereby the transmission characteristic is smaller, if the signal contains only small or zero high-frequency components, than if high-frequency components of larger amplitude are present in the signal. For example, see British Pat. Specification No. 685,483.

SUMMARY OF THE INVENTION

The disturbances in a wide-band signal can be reduced if a coherent disturbance modulation can be subtracted from the useful signal. This coherent disturbance modulation may be derived only out of the disturbed useful signal. For the above-mentioned instance where triangular noise is present in the disturbance signal, it will suffice if the disturbance modulation is derived from the higher-frequency range of the wide-band useful signal.

In accordance with the invention an arrangement is provided which divides the high signal-frequencies into two signal-amplitude ranges. This is done, for example, in a circuit arrangement for reducing high-frequency noise disturbances in wide-band electrical signals, particularly television signals, wherein the transmission characteristic for the high signal-frequencies of small amplitude is smaller than it is for the high signal-frequencies with large amplitude. The signals of the first range have amplitudes below a predetermined value, preferably corresponding substantially to the amplitude of the disturbances, and the signals of the second range have amplitudes lying above said predetermined value. The range of small signal-amplitudes is subtracted, possibly after equalization of level and transit time, from the wide-band signal, and the range of amplitudes lying above the predetermined value is combined additively in a suitable proportion to the difference signal thus formed.

Thus, in the circuit arrangement according to the invention, the signal components of small amplitude, which correspond substantially to the amplitude range of the disturbance signal in the higher-frequency range of the signal, are subtracted from said signal and thereby compensate the coherent disturbance-signal components contained in the signal. This compensation is complete if no high-frequency components of the useful signal are contained in the original signal. This is the case when the television signal corresponds to picture components which exhibit a uniform brightness or only slow changes of brightness. For the high-frequency components of the picture signal which correspond to picture components rich in detail with sudden fluctuations of brightness, the suppression of the disturbance is incomplete. Nevertheless the achievable visual reduction of the disturbances in a television picture is very effective if the circuit arrangement according to the invention is used, because sudden brightness fluctuations occur, as a general rule, in only a small portion of the area of a television picture.

The circuit arrangement according to the invention is also particularly advantageous for the reduction of disturbances in color television signals if, in these signals the disturbances are reduced in the range of the color-carrier frequency. These high-frequency disturbances are, as is well-known, transposed during decoding into a lower frequency range and are then situated in a region of high disturbance-value, in particular also by reason of the fact that these disturbances are reproduced in color.

By adding the high frequency signal components freed from disturbances to the difference signal, the loss of information caused by the suppression of the disturbance is at least partially restored.

BRIEF DESCRIPTION OF THE DRAWINGS

The invention will now be explained in more detail with the aid of the practical examples represented in the accompanying drawings, which show the following:

FIGS. 2*a* through 2*f* are waveform diagrams showing the changes experienced by a signal increase in the individual stages of the circuit arrangement according to FIG. 1.

FIG. 3 shows a preferred circuit example of an arrangement for the amplitude division of the signal in accordance with the invention.

DESCRIPTION OF THE PREFERRED EMBODIMENT

Figure 1:
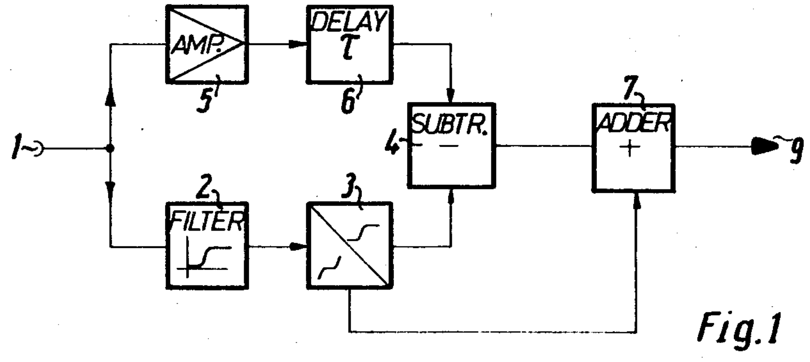
FIG. 1 is a block diagram of a circuit arrangement in accordance with the invention.

In FIG. 1, the wide-band signal accompanied by disturbances is delivered to the circuit arrangement at the point 1, and is divided into two signal paths, of which the one transmits the signal with full bandwidth, while the second path conducts only the higher frequencies of the signal. For this purpose this second signal path contains a high pass filter or a band-pass filter 2, which admits only frequencies situated above a definite limiting frequency. In the case of a television signal, for example, the cutoff of a high pass filter may be 2 mc./s., or the band-pass filter may have a range of high frequencies of 2–5 mc./s. The high frequency component of the signal then arrives at an amplitude-division device 3, which performs a division of the amplitudes of the high-frequency signal component into a range of small amplitudes below a predetermined value and into another amplitude range above said value. The predetermined value will amount substantially to the mean disturbance-amplitude in the particular frequency range of the signal.

The amplitude range of the high frequency signal components lying below the predetermined value is now subtracted in a subtraction stage 4 from the signal having the full bandwidth.

In order to ensure that the two signals correspond as regards amplitude and time, an amplifier 5 is provided in the path of the wide-band signal, preferably of adjustable amplification, and, if needed, a delay device 6 is also provided for transmit-time compensation.

If the frequency spectrum of the input signal contains substantially no components of high frequency, then only the disturbances in the high frequency range of the signal will arrive at the subtraction stage 4 after passing through the filter 2 and the amplitude-divider device 3, and will there compensate the disturbance components in the wide-band signal, provided that the disturbance signals in both channels are coherent with respect to amplitude and phase, which condition can be achieved by adjustment of the amplification of the amplifier 5 and, if necessary, adjustment of the transmit-time by the delay device 6.

The above-described wherein the high frequency range of the signal contains substantially only the disturbance signal, exists in a television signal when the television signal corresponds to picture areas of uniform brightness or slow-varing brightness. In this case a complete elimination of the disturbances in the upper-frequency range of the television signal takes place, so that the latter now contains only the disturbances at low frequencies of correspondingly smaller energy content as compared with the disturbance signal which was present in the entire frequency range. This effect results in a substantial reduction of the disturbance effect in corresponding parts of the television picture.

When the frequency spectrum of the input signal also contains components in the higher-frequency region, the amplitude-division device 3 and the subtraction stage 4 have the effect also of suppressing the components of the useful signal which lie below the predetermined value (limiting level). These components are therefore lacking in the output signal from the subtraction stage 4, which represents a certain loss of information. In order at lease partially to compensate for this loss of information, the signal compensate in the higher-frequency range of the signal whose amplitude lies above the predetermined value are added in an adding stage 7 to the output signal from the subtraction stage, so that these components are again present at the output terminal 9 of the circuit arrangement.

This effect will now be explained in more detail in connection with FIGS. 2*a* through 2*f*, which show schematically the signal forms appearing in the individual stages of the circuit arrangement for a signal step having an rise time in the high-frequency range of the signal.

Figures 2A, 2B, 2C, 2D:
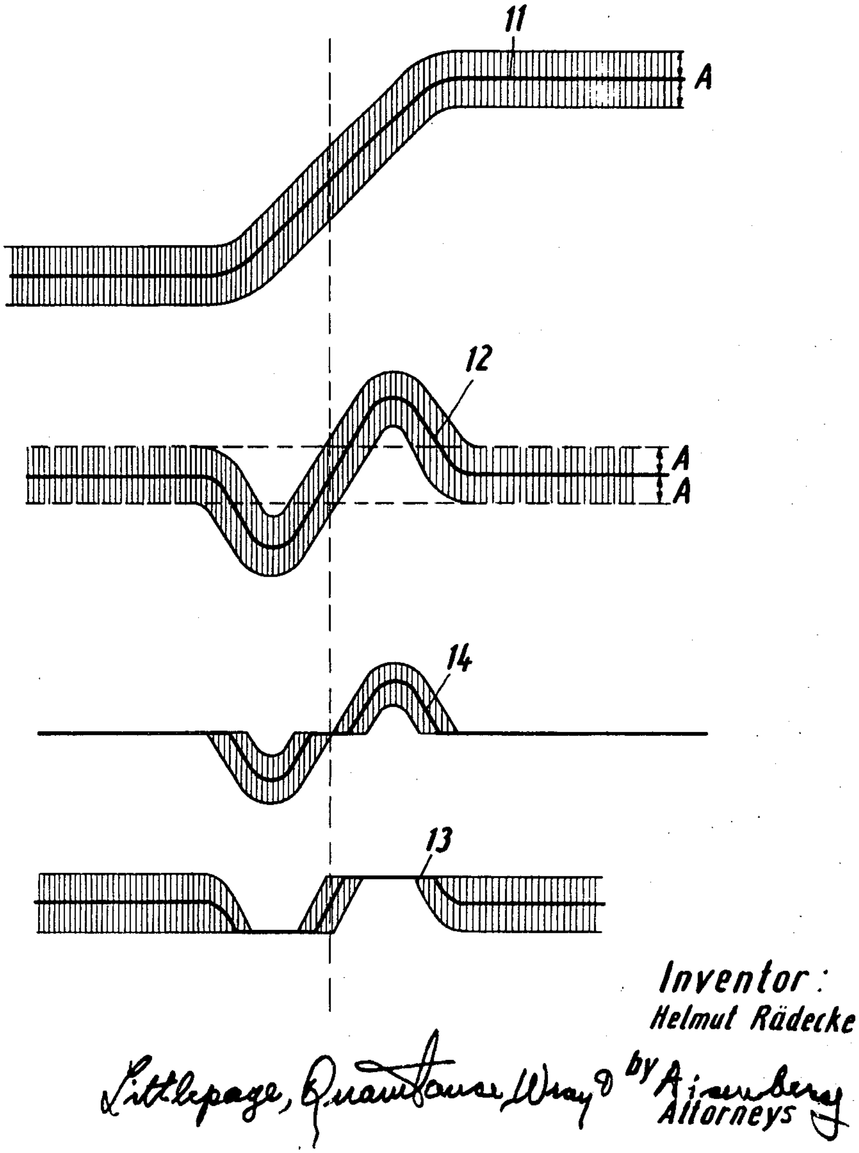

In FIG. 2*a* the reference 11 represents the graph of the useful signal, which has superimposed upon it a high frequency disturbance with the peak central valve 2A symmetrical to the useful signal. The filter 2 (FIG. 1) admits only the high-frequency components of the frequency spectrum of the signal step. This corresponds substantially to a double differentiation of the signal step, which therefore exhibits the shape of FIG. 2*b* following the filter. In FIG. 2*b* there is also recorded the limiting level of the double sided amplitude limiter of the amplitude-divider device 3, which level should, by hypothesis, correspond substantially to the amplitude of the disturbances in the signal according to FIG. 2*a*. The signal according to FIG. 2*b* is deformed by device 3 to a shape of the kind shown in FIGS. 2*c* and 2*d*. FIG. 2*c* shows the signal below the predetermined value, while FIG. 2*d* show the signal above this value, as formed by the amplitude-divider device 3.

It is seen from FIG. 2*c* that, in the region of the signal step, no disturbances are now present, but they are present only outside this region. These remaining disturbances compensate, in the subtraction stage 4, the coherent disturbances in the wide-band signal. Furthermore it is seen that the high-frequency components of the signal step in the amplitude range above the predetermined value are cut down by the amplitude limitation in device 3 and therefore are only partially missing in the output signal of the subtraction stage. However, these components are present in the signal situated above the limiting value of device 3, as may be seen from FIG. 2*d*. These signal components also contain the disturbances superimposed upon them.

FIG. 2*e* shows the signal output from the subtraction stage 4. It is seen that the disturbances outside the range of the signal step compensate each other so that only the pure useful signal 15 remains. However, at the beginning and end of the signal step the disturbances are available as at the beginning. Finally, in FIG. 2*f*, the signal at the output 9 of the circuit arrangement according to FIG. 1 is shown. This signal results from adding the signal according to FIG. 2*e* to the high-frequency signal components lying above the limiting value according to FIG. 2*d*. It is seen that the information loss caused by the amplitude limitation and subtraction in the high frequency signal component is partially recovered. However, the disturbances in the region of the signal step are present as at the beginning. It has been stated earlier, however, that these disturbances are limited in the case of a television signal to relatively small regions of the picture surface having many picture details and sudden transits of brightness, and do not therefore represent an important phenomenon in these regions. Seen therefore in its entirely, the circuit arrangement according to the invention allows the achievement of a very effective improvements in the signal-to-noise ratio in a television picture.

FIG. 3 shows a practical example of the device 3 for the amplitude separation of the signal into an amplitude range below a predetermined value and an amplitude range above a predetermined value. The circuit contains two transistors with opposite conductivity type, for example transistor 31 is of the PNP-type and transistor 32 of the NPN-type. The high-frequency signal component is delivered to the emitters of both transistors with equal signal amplitude but with a different mean potential with respect to the bases of the transistors. For this purpose a further transistor 33, which operates as an amplifier, can be connected in front of the transistors 31 and 32. The base of this transistor is connected to the input 12 of the high-frequency signal component. In the emitter circuit of the transistor 33, a resistance 34 for negative back coupling and stabilization is inserted. The collector circuit contains a resistance 35, preferably adjustable, which is paralleled by a capacitor 36 for the signal frequency and contains a further resistance 37. The emitters of the two transistors 31 and 32 are connected to the ends of the adjustable resistance 35 and therefore receive the same signal which appears at the collector resistance 37. Because of the DC component of this signal, a voltage drip will appear across the resistance 35. The resistance 35 therefore produces the potential frequency between the signal means values. This corresponds to predetermined value of the arrangement and can be adjusted to the desired value by adjusting the resistance 35. The potential of the bases of the transistors 31 and 32, which lies centrally between the mean value of the emitter potential of the transistors 31 and 32 is produced by the voltage divider consisting of two equal resistances 38 and 39. A capacitor 40 creates a high-frequency connection to ground for the bases of the transistors 31 and 32.

At the emitters of the two transistors 31 and 32, the amplitude-limited signal lying below the threshold value of the device is taken off. The signal components lying above this threshold value may be taken off at the collectors of the two transistors 31 and 32. These collectors are connected by a capacitor 41 for the signal frequencies, and are respectively connected through the collector resistances 42 and 43 to the operating voltages. Thus, the transistors 31 and 32 perform simultaneously the amplitude separation of the signal into a range below the predetermined value and a range above the predetermined value. The reference level for the amplitude limitation and the response threshold for the signal amplitudes are therefore necessarily equal to each other and are adjustable in common by the resistance 35.

What is claimed is:

1. A circuit arrangement for reduction of high-frequency noise disturbances in a wide-band electrical signal comprising;
   a. amplitude-division means responsive to the higher-frequency components of said wide-band signal for dividing said components into a low-amplitude signal having signal amplitudes below a predetermined value and a high-amplitude signal having signal amplitudes above said predetermined value,
   b. means for subtracting said low-amplitude signal from said wide-band signal to form a difference signal, and
   c. means for adding said high amplitude signal to said difference signal to derive an output signal, whereby the transmission characteristic for the higher-frequency signals having low amplitude is smaller than it is for the high-frequency signals having high amplitude.

2. A circuit arrangement according to claim 1 wherein said wide-band electrical signals are television signals, said predetermined value corresponds to a typical maximum value of the noise disturbance, and further comprising means for equalizing the transit time and level of said low-amplitude signal before using it in said means for subtracting.

3. A circuit arrangement according to claim 1 wherein said amplitude-division means further comprises a. two transistors of opposite conductivity type, each having emitter, collector and base,
b. means for delivering said higher frequency components to the emitters of said two transistors with different DC mean values corresponding to said predetermined value being associated with the two emitter signals,
c. means for bringing the bases of the two transistors to a common mean potential between the DC mean values,
d. means for taking the signal components lying below the predetermined value from the emitters of the transistors, and
e. means for taking the signal components lying above the predetermined value from the collectors of the transistors.

4. A circuit arrangement according to claim 3, wherein said two transistors are of a type typified by silicon transistors which have a sufficiently high-forward voltage that the fixing of the predetermined value can be effected with only three resistances.